United States Patent [19]

Nguyen et al.

[11] Patent Number: 5,034,978
[45] Date of Patent: Jul. 23, 1991

[54] UNIVERSAL CHANNEL UNIT SWITCHABLE BETWEEN TWO WIRE AND FOUR WIRE CONFIGURATIONS

[75] Inventors: Ninh T. Nguyen; John A. Neely; Terry D. Bolinger, all of Aurora, Colo.

[73] Assignee: XEL Communications, Inc., Aurora, Colo.

[21] Appl. No.: 452,268

[22] Filed: Dec. 15, 1989

[51] Int. Cl.$^5$ .............................................. H04M 9/00
[52] U.S. Cl. .................................... 379/402; 379/345; 379/250; 379/403; 379/405
[58] Field of Search ............... 379/345, 402, 403, 404, 379/405, 324, 413, 250; 370/24–31

[56] References Cited

U.S. PATENT DOCUMENTS 4,598,172  7/1986  Eriksson ........................... 379/93 X
4,771,449  9/1988  Kiko et al. ......................... 379/402 X Primary Examiner—James L. Dwyer
Assistant Examiner—M. Shehata
Attorney, Agent, or Firm—Dorr, Carson, Sloan & Peterson

[57] ABSTRACT

The universal channel unit includes a channel interface circuit that uses a pair of fixed ratio transformers to terminate both two wire and four wire analog transmission facilities on a selectable basis. The universal channel unit also includes a plurality of signalling circuits, each of which is switchably connectable via the channel interface unit to provide a DC signalling interface to match the signalling format required by the associated analog transmission facility. The signalling circuits include: DX, FXO, FXS, and other DC signalling circuits. The AC component of the signals carried by the analog transmission facility is output to an adaptive impedance and balance circuit which functions to closely match the impedance of the analog transmission facility and minimize signal reflections under control of a microprocessor. This impedance and balance network is connected to a PCM interface that includes an adaptive echo canceller circuit as well as equalization and gain control circuits.

22 Claims, 3 Drawing Sheets

UNIVERSAL CHANNEL UNIT SWITCHABLE BETWEEN TWO WIRE AND FOUR WIRE CONFIGURATIONS

FIELD OF THE INVENTION

This invention relates to telephone transmission circuits and, in particular, to a universal channel unit that is switchable between a two wire and a four wire mode for various signalling formats and that includes an adaptable balance circuit to provide improved echo cancellation therein.

PROBLEM

It is a problem in the field of telephone channel banks to efficiently interconnect analog and digital transmission facilities. This interconnection is accomplished by the use of a multiplexor and a plurality of channel units. The multiplexor interconnects a digital transmission facility that carries a plurality of multiplexed digital signals with a like plurality of channel units. Each channel unit functions to convert between the analog format of an associated analog transmission facility and the digital format of the signals processed by the digital multiplexor.

The channel units typically include a two wire to four wire hybrid circuit to terminate either a two wire interconnection or a four wire interconnection to the associated analog transmission facility to the digital multiplexor. Analog telephone transmission equipment is either two wire or four wire in nature. The two wire circuits provide full duplex transmission and function to carry voice signals in both directions simultaneously over a single pair of wires. Four wire circuits operate in a simplex mode and contain a separate pair of wires for each direction of transmission. Two wire transmission circuits are typically used in the local subscriber plant while the four wire transmission circuits are used in toll and long distance trunks. The channel unit also includes associated impedance balancing and matching circuitry to present the analog transmission facility with a precise impedance to maintain precise signal levels and eliminate undesirable feedback. A typical two wire to four wire hybrid circuit is implemented using a hybrid transformer that contains four ports. A first port connects to a two wire analog transmission facility, a second port connects to the four wire receive output port, a third port connects to the four wire transmit port, and a fourth port connects to an impedance balancing and matching circuit. If the impedance of the transmission facility is exactly matched by the impedance balancing and matching circuit of the fourth or impedance matching port, there is no echo from the four wire receive port to the four wire transmit port. Any mismatch in these impedances causes undesirable feedback between the four wire receive and transmit ports. This appears as an echo back toward the four wire line.

Existing transmission facilities typically include manually operable switches that allow a craftsperson to select a particular matching impedance on a balance network contained within the hybrid circuit to approximate the impedance of the transmission facility that is connected to the hybrid circuit. While such an arrangement enables the craftsperson to closely approximate the impedance of the transmission facility, it cannot be matched perfectly. This process is also very time consuming resulting in a significant amount of expense. The amount of mismatch directly affects the magnitude of the undesirable feedback between the four wire transmit and receive facilities.

An additional problem in channel interface units is that the analog transmission facilities can be two wire or four wire facilities and are implemented using one of a number of different DC signalling format. The hybrid transformer provides good impedance matching but is not easily susceptible to reconfiguration to support both two/four wire and diverse DC signalling formats. Therefore, many application-specific channel units are required to match particular transmission facilities. This lack of adaptability adds significant inventory and manufacturing expense due to the multitude of different channel units that are required.

There presently exists no channel unit that adequately solves the problems of impedance mismatch with its associated undesirable signal feedback as well as adaptability to diverse DC signalling arrangements and the two/four wire configurations.

SOLUTION

The above described problems are solved and a technical advance achieved in the field by the universal channel unit of the present invention. The universal channel unit includes a channel interface circuit that uses a pair of fixed ratio transformers to terminate both two wire and four wire analog transmission facilities on a selectable basis. The pair of transformers are switchably connectable into either a two wire or a four wire termination mode. Therefore, the channel interface circuit can be used to interconnect to a four wire analog transmission facility or a two wire analog transmission facility.

The universal channel unit includes a plurality of DC signalling circuits, each of which is switchably connectable via the transformers in the channel interface unit to provide a DC signalling interface to match that required by the particular analog transmission facility connected to the universal channel unit. The signalling circuits include: DX, FXO, FXS, and various other well known DC signalling circuits. The signalling circuits provide the DC interface through the termination transformers to the connected analog transmission facility.

The AC component of the signals carried by the analog transmission facility is output by the termination transformers to an adaptive impedance and balance network which functions to match the impedance of the termination transformers with that of the analog transmission facility. This adaptive impedance and balance network includes programmable termination impedance and programmable gain elements in both transmission directions. The balance network is microprocessor controlled to closely match the associated analog transmission facility. An adaptive echo canceller system monitors the signals carried by the universal channel unit and adjusts the amount of feedback provided by the balance network between the unidirectional AC signal paths. This balance network provides an adaptable compensation for the unwanted feedback on the transmission facility to thereby cancel echoes that typically plague hybrid circuits.

DETAILED DESCRIPTION

In telephone transmission systems, a channel bank interconnects a digital transmission facility with a plurality of analog transmission facilities. This interconnection is accomplished by the use of a multiplexor and a plurality of channel units. The multiplexor interconnects a digital transmission facility that carries a plurality of multiplexed digital signals with the channel units. Each channel unit functions to convert between the analog format of the associated analog transmission facility and the digital format of the signals processed by the multiplexor.

Figure 1:
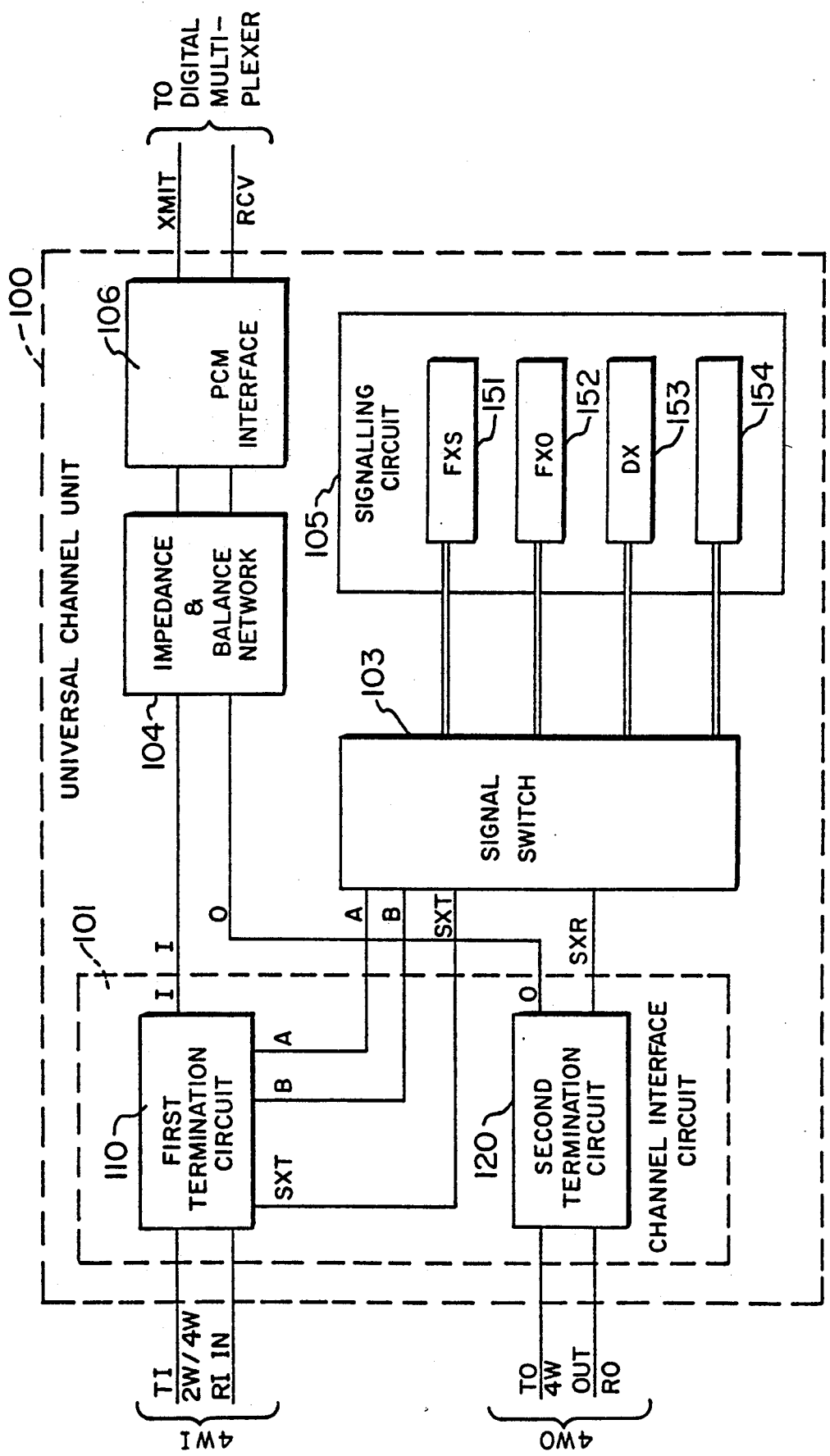
FIG. 1 illustrates the universal channel unit in block diagram form.

FIG. 1 illustrates the architecture of the universal channel unit 100 of the present invention in block diagram form. The universal channel unit 100 functions to interconnect the digital multiplexor (not shown) PCM line with an analog transmission facility that can be either a two wire or a four wire facility. If the analog transmission facility is a two wire apparatus, the analog transmission facility is connected to the pair of leads labeled 4WI. If the analog transmission facility is a four wire apparatus, a first pair of the four wires is connected to the leads 4WI while a second pair of the analog transmission facility is connected to leads 4WO. In either case, channel interface circuit 101 functions to provide a termination for the analog transmission facility whether it be two wire or four wire. The channel interface circuit 101 includes a first termination circuit 110, that includes three ports. The first port of first termination circuit 110 is connected to the two wire analog transmission facility or, in the case of a four wire analog transmission facility, to the four wire transmit in port of the analog transmission facility. A second port of the first termination circuit 110 provides a plurality of signal output leads labeled A, B, SXT, that provide a DC signalling interface for the associated analog transmission facility. Finally, a third port consisting of lead I provides an AC signal output that carries the voice signals in bidirectional fashion between the analog transmission facility and impedance and balance network 104.

For a four wire analog transmission facility, a second termination circuit 120 is used to interconnect the four wire receive out port of the four wire facility via a first port labeled 4WO. A second port of the second termination circuit 120 consists of lead SXR which is the DC signalling termination for the four wire connection. A third port of the second termination circuit 120 consists of lead 0 which provides an AC signal input that carries the voice signals from the impedance and balance network 104 to the analog transmission facility. Thus, the first termination circuit 110 is used to provide a two wire analog transmission facility termination while in a four wire facility configuration, both the first termination circuit 110 and the second termination circuit 120 each function to terminate one of the signalling pairs of the four wire facility.

The interconnection of the first termination circuit 110 and the second termination circuit 120 for either two wire or four wire transmission facilities is accomplished by signal switch 103. In particular, the signal switch 103 is connected to the second port of both of first and second termination circuits 110, 120 and functions to interconnect these DC signalling leads to signalling circuit 105. In particular, signal switch 103 switches either the leads A, B, or the leads SXT, SXR to signalling circuit 105. The signal leads A, B, represent the termination required for interconnection to a two wire analog transmission facility while the DC signalling leads SXT, SXR represent the DC signalling leads required to terminate a four wire analog transmission facility.

Signalling circuit 105 includes a plurality of DC interface circuits 151-154 each of which represents a particular DC signalling format required by a corresponding analog transmission facility. These various signalling interfaces are well known in the art and are not disclosed in detail herein for the purpose of simplicity. Suffice it to say, that signal switch 103 interconnects a selected one of signal interfaces 151-154 to the appropriate pair of signal leads A, B or SXT, SXR.

The above described apparatus provides the DC signalling interconnection required to terminate either a four wire or a two wire analog transmission facility. The AC or voice signal carried by the analog transmission facility is output by channel interface circuit 101 on signal leads I, O. In interconnecting to a two wire analog transmission facility, lead I carries the voice signals bidirectionally while in a four wire analog transmission facility connection, lead I carries the transmit signal while lead O carries the receive signal of the analog transmission facility.

PCM interface 106 functions to terminate the digital multiplexor interface and provide an echo cancellation function. Impedance and balance network 104 provides a programmable termination impedance to match the associated analog transmission facility as well as a precision compensation network to minimize signal reflections from the interface with the analog transmission facility interface. This reduces the magnitude of the reflected signal before the echo canceller in PCM interface 106 operates on the received signal.

Channel Interface Circuit

Figure 2:
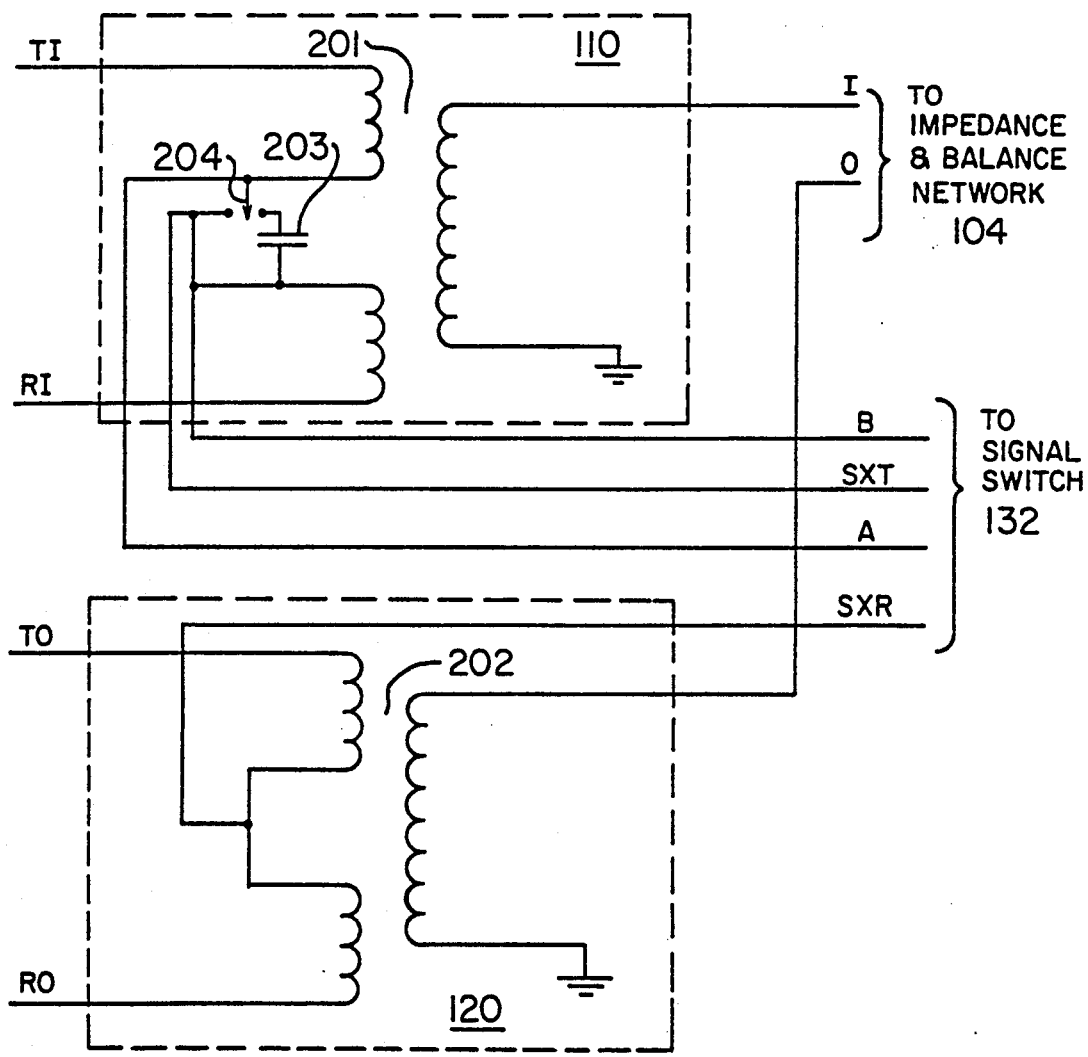
FIG. 2 illustrates further details of the termination transformers of the channel interface circuit.

FIG. 2 illustrates in further detail the realization of channel interface circuit 101 using fixed ratio transformers. First termination circuit 110 includes a fixed ratio transformer 201 that provides the DC loop current isolation between the associated analog transmission facility and the PCM interface to the digital multiplexor. Switch 204 and capacitor 203 are used to provide the capability to switch channel interface circuit 101 between two wire and four wire operation. Transformer 201 has a fixed winding ratio and a low DC impedance in both the primary and secondary sides. Switch 204 interconnects capacitor 203 in series between the two primary windings of transformer 201 to provide the two wire DC signalling. In this configuration, the DC signals that appear on leads TI and RI are carried by leads A, B respectively to signal switch 103 for interconnection to one of the signal interfaces 151-154 contained in signalling circuit 105. Capacitor 203 provides DC isolation between the two windings on the primary side of transformer 201 in the two wire mode yet permits AC coupling there between. Capacitor 203 is shorted out in the four wire mode. The AC signal that appears on the primary winding of transformer 201 is coupled to the secondary winding of transformer 201 where it is output on lead I.

Similarly, second termination circuit 120 includes one to one transformer 202 that is connected on the primary side to leads TO, RO and on the secondary side to voice output lead 0. Transformer 202 provides the four wire receive termination and uses lead SXR as the DC signalling lead that is interconnected by signal switch 103 to signalling circuit 105.

Impedance and Balance Network

Figure 3:
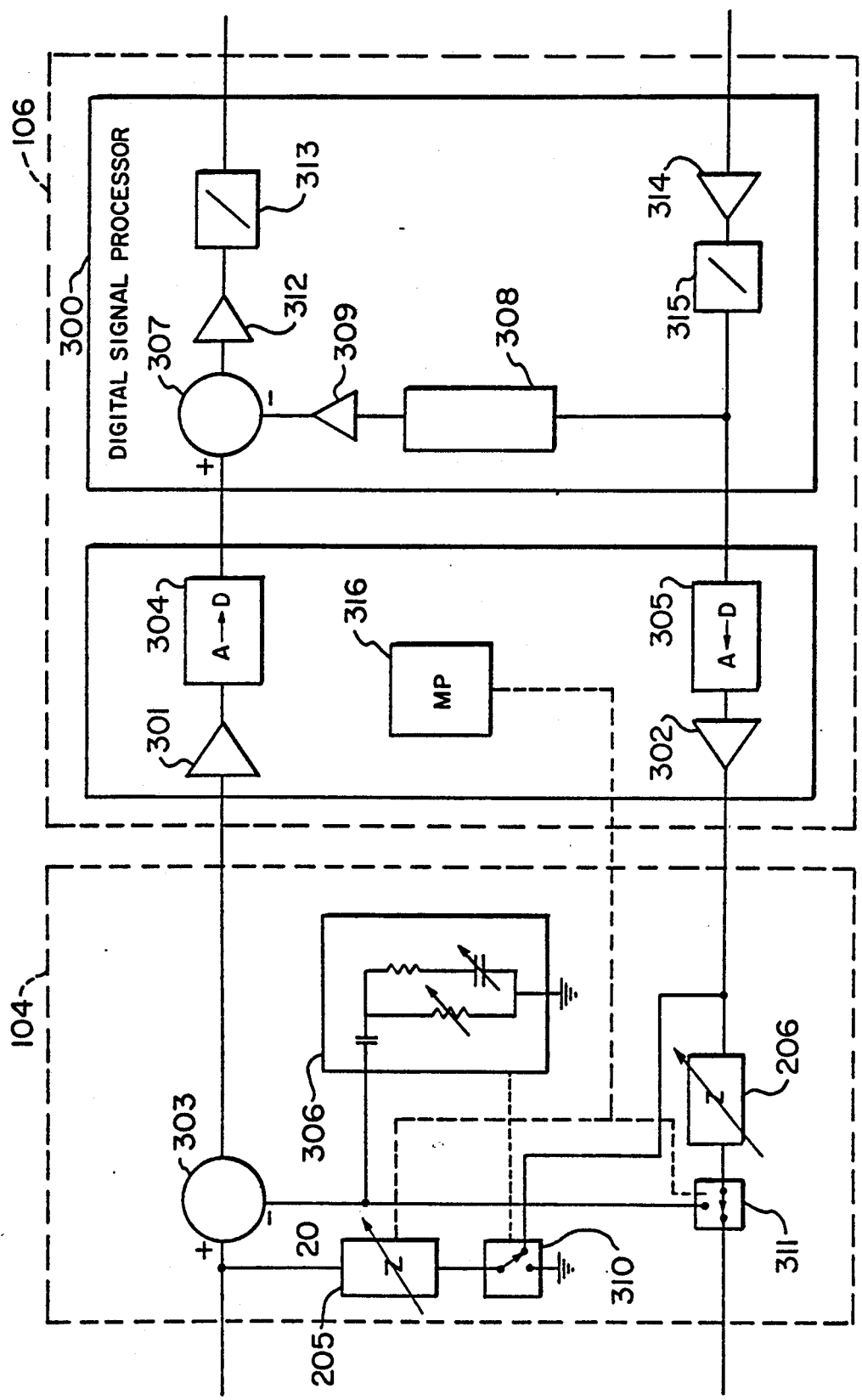
FIG. 3 illustrates further details of the adaptive impedance and balance network and the PCM interface.

FIG. 3 illustrates further details of impedance and balance network 104 and PCM interface 106. When driving a two wire (full duplex) line from a "four wire" source, it is necessary to separate the signals going in opposite directions. The interconnection of these interfaces is accomplished by the use of a hybrid circuit with a precision balance network which functions to minimize signal reflections due to interface impedance mismatch. The universal channel unit 100 implements the hybrid and precision balance network by use of impedance and balance network 104 and PCM interface 106.

Impedance and balance network 104 includes a signal summing circuit 303, adjustable impedances 205, 206, 306 and mode switches 310, 311. The adjustable impedances 205, 206, 306 are programmable and can be implemented by the use of a feedback loop to multiply a fixed impedance by a scale factor. Mode switches 310, 311 are operable by a user to select two wire or four wire mode of operation. In the two wire mode, switch 310 interconnects the output of amplifier 302 in PCM interface 106 to lead I via adjustable impedance 205. Mode switch 311 interconnects the output of amplifier 302 via adjustable impedance 206 to adjustable impedance 306. This signal at this junction goes to summing circuit 303 to cancel the return component of the output of amplifier 302 applied to lead I by adjustable impedance 205 that appears at summing circuit 303. In the four wire mode of operation, mode switch 310 connects adjustable impedance 205 between lead I and circuit ground while mode switch 311 connects the output of amplifier 302 via adjustable impedance 206 to lead 0. The impedance values of adjustable impedances 205, 206 are set by microprocessor 316 at the installation of universal channel unit 100. The user activates microprocessor 316 to match the standard impedance appropriate for the associated analog transmission facility which typically would be between 150 to 1200 ohms in value. Similarly, (if in a 2w mode) microprocessor 316, operating in conjunction with digital signal processor 300, establishes a programmed impedance value for adjustable impedance 306 as is described in further detail below. The values of adjustable impedances 206 and 306 are selected to reduce the reflected signal from lead I before this signal is converted into digital format in PCM interface 106.

PCM interface 106 includes control microprocessor 316, digital signal processor 300 and the gain control functions 301 and 302, plus the A to D (304) and D to A (305) functions (CODEC). The transmit signal on lead I is output, with error signal and reflected signal cancellation, by summing circuit 303. This transmit signal is applied through programmable gain element 301 to analog to digital converter 304 to produce a PCM format transmit signal. Similarly, in the reverse direction, the PCM format receive signal is converted into an analog format receive signal by digital to analog converter 305 and this signal is applied via programmable gain element 302 to lead 0.

The digital signal processor 300 in PCM interface 106 functions both as an echo canceller and an equalization circuit. The echo canceller function is schematically represented by summing circuit 307, adjustable gain element 309 and programmable filter 308. In operation, an "adapt and freeze" method of setting the echo canceller coefficients is used. A plurality of signal samples are used to generate the coefficients which converge over time to a value which is frozen for the associated analog transmission facility. Programmable filter 308 thereafter produces a signal that is an estimate of the echo signal component of the PCM format transmit signal received from analog to digital converter 304. Adjustable gain element 309 adjusts the magnitude of the generated estimated echo signal and summing circuit 307 subtracts the resultant estimated echo signal from the received PCM format transmit signal. Gain elements 312, 314 and equalization circuits 313, 315 represent the signal equalization function of digital signal processor 300 that adjusts the gain and phase of the PCM signal versus frequency for the transmit and receive signal, respectively.

Dynamic Balance Network

As mentioned above, microprocessor 316 selects the impedance value of adjustable impedance 306, which is used as a precision compensation network to reduce the magnitude of signal reflections present on lead I before these signal reflections reach the CODEC in PCM interface 106. This enhances the performance of the echo canceller by providing a pre-cancellation of the reflected signal. A difficulty with this process is that the impedance of universal channel unit 100 and the associated analog transmission facility both vary with frequency. As a result, the magnitude of the reflected signal is also a function of frequency and is measured as trans-hybrid balance. If a single frequency is selected, two variable elements in adjustable impedance 306 are sufficient to drive the reflected signal to zero. This is accomplished by using one variable element to cancel the "real" component of the complex reflected signal and the second variable element to cancel the "imaginary" component of the complex reflected signal. In a practical application, the analog transmission facility is not a simple impedance and requires more than two variable elements in adjustable impedance 306 to reduce the reflected signal to a minimum. By also varying impedance 206, the number of variables is increased to four, substantially improving the cancellation possible. In operation, digital signal processor 300 and microprocessor 316 are cooperatively operative to optimize trans-hybrid balance as averaged across the audio band of frequencies. The digital signal processor 300, under control of microprocessor 316 produces a pseudo random signal that contains a fairly constant energy level across the audio spectrum and also measures the reflected signal. Adjustable impedances 206 and 306 contains a plurality of variable elements (ex. - 4) and microprocessor 316 calculates values for these variable elements that optimize trans-hybrid loss averaged across the audio band. The algorithm involves measuring the trans-hybrid loss as it varies when each of the four variables is changed. A four dimensional gradient is computed, which gives the direction of maximum change. This, is used for making the next adjustment to the impedances. In this manner, microprocessor 316 finds the values for the elements contained in the adjustable impedances 206 and 306.

Summary

Thus, the universal channel unit includes a channel interface circuit that uses a pair of fixed ratio transformers to terminate both two wire and four wire analog transmission facilities on a selectable basis. The universal channel unit also includes a plurality of signalling circuits, each of which is switchably connectable via the channel interface unit to provide a DC signalling interface to match the signalling format required by the associated analog transmission facility. The signalling circuits include: DX, FXO, FXS, and other DC signalling circuits. The AC component of the signal carried by the analog transmission facility is output to an adaptive impedance and balance circuit which functions to closely match the impedance of the analog transmission facility and minimize signal reflections under control of a microprocessor. This impedance balance network is connected to a PCM interface that includes an adaptive echo canceller circuit as well as equalization and gain control circuits.

While a specific embodiment of this invention has been disclosed, it is expected that those skilled in the art can and will design alternate embodiments of this invention that fall within the scope of the appended claims.

I claim:

1. A hybrid circuit for interconnecting a digital line with either a two wire analog transmission facility or a four wire analog transmission facility which has a first pair of wires and a second pair of wires, comprising:
    means for terminating said two wire analog transmission facility and said four wire analog transmission facility including:
        first means for terminating said two wire analog transmission facility and said first pair of wires of said four wire analog transmission facility;
        second means, cooperatively operational with said first terminating means, for terminating said second pair of wires of said four wire analog transmission facility;
    dynamic balance means, connected to the interconnecting said first and second terminating means with said digital line, for automatically compensating for any impedance mismatch between said first and second means and said connected analog transmission facility;
    a plurality of interface circuits;
    means for switchable interconnecting a selected one of said interface circuits with said terminating means.

2. The apparatus of claim 1 wherein said interface circuits each have a two wire input, said switchably interconnecting means includes:
    means for interconnecting said two wire input to said first terminating means;
    means for connecting each of said two wires to a respective one of said first and second terminating means.

3. The apparatus of claim 2 wherein said switchably interconnecting means further includes:
    means for interconnecting said two wires with one of said plurality of interface circuits.

4. The apparatus of claim 3 wherein said switchably interconnecting means further includes:
    means for storing an indication received from a user of the identity of said selected interface circuit.

5. The apparatus of claim 2 wherein said switchably interconnecting means further includes:
    means responsive to data input by a user for activating one of said interconnecting means and said connecting means.

6. The apparatus of claim 1 wherein said dynamic balance means includes:
    means for generating a control signal indicative of the magnitude of the impedance mismatch between said first terminating means and said connected analog transmission facility;
    means connected to said first terminating means for providing a shunt impedance across said first terminating means of impedance value determined by said control signal.

7. The apparatus of claim 1 wherein said plurality of interface circuits include at least one member of the class of circuits including: DX, PLAR, FXO, FXS.

8. The apparatus of claim 1 wherein said first terminating means comprises:
    fixed ratio transformer including:
        first port for connecting to said two wire and said first pair of wires of said four wire analog transmission facility;
        second port for providing at least one output lead carrying AC signals transmitted on said connected analog transmission facility;
        third port for providing at least one output lead for carrying DC signals transmitted on said analog transmission facility.

9. The apparatus of claim 8 wherein said second termination means includes:
    fixed ratio transformer including:
        first port for connecting to a four wire analog transmission facility;
        second port for providing at least one output lead for carrying DC signals transmitted on said connected analog transmission facility.

10. The apparatus of claim 9 wherein said interface circuits each have a two wire input, said switchably interconnecting means includes:
    means for interconnecting said two wire input to said third port of said first terminating means;
    means for connecting each of said two wires to a respective one of said third port in said first terminating means and said second port in said second terminating means.

11. The apparatus of claim 10 wherein said switchably interconnecting means further includes:
    means for interconnecting said two wires with one of said plurality of interface circuits.

12. The apparatus of claim 11 wherein said switchably interconnecting means further includes:
    means for storing an indication received from a user of the identity of said selected interface circuit.

13. The apparatus of claim 12 wherein said switchably interconnecting means further includes:
    means responsive to data input by a user for activating one of said interconnecting means and said connecting means.

14. The apparatus of claim 1 further including:
    means interposed between said dynamic balance means and said digital line for cancelling echo signals contained in signals transmitted by said dynamic balance means to said digital line.

15. A hybrid circuit for interconnecting a digital line with either a two wire or four wire analog transmission facility comprising:
    means for terminating said two wire analog transmission facility and said four wire analog transmission facility, where said four wire analog transmission facility contains a first and a second pair of wires, including:
  first fixed ratio transformer including:
    first port for connecting to a two wire and said first pair of said four wire analog transmission facility,
    second port for providing at least one output lead for carrying AC signals transmitted on said connected analog transmission facility,
    third port for providing at least one output lead for carrying DC signals transmitted on said connected analog transmission facility,
  second fixed ratio transformer including:
    first port for connecting to said second pair of said four wire analog transmission facility,
    second port for providing at least one output lead for carrying DC signals transmitted on said connected analog transmission facility,
  dynamic balance means, connected to and interconnecting said first and second fixed ratio transformer with said digital line, for automatically compensating for any impedance mismatch between said first and second fixed ratio transformer and said connected analog transmission facility;
  a plurality of interface circuits;
  means for switchably interconnecting a selected one of said interface circuits with said terminating means.

16. The apparatus of claim 15 wherein each of said interface circuits have a two wire input, said switchably interconnecting means includes:
  means for interconnecting said two wire input to said second port of said first fixed ratio transformer;
  means for connecting each of said two wires to a respective one of said third port in said first fixed ratio transformer and said second port in said second fixed ratio transformer.

17. The apparatus of claim 16 wherein said switchably interconnecting means further includes:
  means for interconnecting said two wires with one of said plurality of interface circuits.

18. The apparatus of claim 16 wherein said switchably interconnecting means further includes:
  means for storing an indication received from a user of the identity of said selected interface circuit.

19. The apparatus of claim 18 wherein said switchably interconnecting means further includes:
  means responsive to data input by a user for activating one of said interconnecting means and said connecting means.

20. The apparatus of claim 15 wherein said digital line includes a first and a second conductor, said first conductor connected to said first fixed ratio transformer, said dynamic balance means includes:
  means for generating a control signal indicative of the magnitude of the impedance mismatch between said first fixed ratio transformer and said connected analog transmission facility;
  means connected to said first fixed ratio transformer for providing a shunt impedance across said first fixed ratio transformer of impedance value determined by said feedback control signal.

21. The apparatus of claim 15 further including:
  means interposed between said dynamic balance means and said digital line for cancelling echoes signals contained in signals transmitted by said dynamic balance means to said digital line.

22. A hybrid circuit for interconnecting a digital line with either a two wire analog transmission facility or a four wire analog transmission facility that has a first pair of wires and a second pair of wires, comprising:
  means for terminating said two wire analog transmission facility and said four wire analog transmission facility including:
    first means for terminating said two wire analog transmission facility and said first pair of wires of said four wire analog transmission facility, comprising:
      fixed ratio transformer including:
        first port for connecting to a two wire and said first pair of wires of said four wire analog transmission facility,
        second port for providing at least one output lead for carrying AC signals transmitted on said connected analog transmission facility,
        third port for providing at least one output lead for carrying DC signals transmitted on said connected analog transmission facility,
    second means, cooperatively operational with said first terminating means, for terminating said four wires analog transmission facility, including:
      fixed ration transformer including:
        first port for connecting to said second pair of wires of said four wire analog transmission facility,
        second port for providing at least one output lead for carrying DC signals transmitted on said connected analog transmission facility;
  dynamic balance means, connected to and interconnecting said first and second terminating means with said digital line, wherein said digital line includes a first and a second conductor, said first conductor connected to said first terminating means, for automatically compensating for any impedance mismatch between said first and second means and said connected analog transmission facility, including:
    means responsive to said first terminating means for generating a control signal indicative of the magnitude of the impedance mismatch between said first terminating means and said connected analog transmission facility,
    means connected to said first terminating means for providing a shunt impedance across said first terminating means impedance value determined by said control signal;
  a plurality of interface circuits;
  means for switchably interconnecting a selected one of said interface circuits, each having a two wire input, with said terminating means, including:
    means for interconnecting said two wire input to said third port of said first terminating means,
    means for connecting each of said two wires to a responsive one of said third port of said first terminating means and said second port of said second terminating means,
    means for interconnecting said two wires with one of said plurality of interface circuits,
    means for storing an indication received from a user of the identity of said selected interface circuit,
    means responsive to data input by a user for activating one of said interconnecting means and said interconnecting means and said connecting means.

* * * * *